United States Patent
Cronin

(10) Patent No.: US 10,421,291 B2
(45) Date of Patent: Sep. 24, 2019

(54) OUT-OF SEQUENCE RETRANSFER PRINTING

(71) Applicant: Entrust Datacard Corporation, Shakopee, MN (US)

(72) Inventor: Patrick C. Cronin, Shakopee, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 0 days.

(21) Appl. No.: 15/985,879

(22) Filed: May 22, 2018

(65) Prior Publication Data

US 2018/0333963 A1 Nov. 22, 2018

Related U.S. Application Data

(60) Provisional application No. 62/509,338, filed on May 22, 2017.

(51) Int. Cl.
| | |
|---|---|
| *B41J 2/325* | (2006.01) |
| *G06K 13/077* | (2006.01) |
| *G06K 1/12* | (2006.01) |
| *B41F 16/00* | (2006.01) |

(52) U.S. Cl.
CPC ............ *B41J 2/325* (2013.01); *G06K 1/121* (2013.01); *G06K 13/077* (2013.01); *B41F 16/00* (2013.01)

(58) Field of Classification Search
CPC ........ B41J 2/325; G06K 1/121; G06K 13/077
See application file for complete search history.

(56) References Cited

U.S. PATENT DOCUMENTS

| | | | | |
|---|---|---|---|---|
| 5,521,626 A | * | 5/1996 | Tanaka | ..................... B41J 2/325 347/176 |
| 6,894,710 B2 | | 5/2005 | Suzuki et al. | |
| 2003/0058326 A1 | | 3/2003 | Araki et al. | |
| 2004/0227805 A1 | * | 11/2004 | Narita | ..................... B41J 2/325 347/187 |
| 2009/0074948 A1 | | 3/2009 | Ihara et al. | |
| 2016/0300128 A1 | | 10/2016 | Alvig et al. | |
| 2017/0008302 A1 | | 1/2017 | Ihara | |
| 2018/0104963 A1 | * | 4/2018 | Benton | ..................... B41J 2/33 |

FOREIGN PATENT DOCUMENTS

WO 2009037166 A1 3/2009

OTHER PUBLICATIONS

International Search Report and Written Opinion issued in PCT/US/2018/033791, dated Sep. 13, 2018, 10 pages.

* cited by examiner

*Primary Examiner* — Lamson D Nguyen
(74) *Attorney, Agent, or Firm* — Hamre, Schumann, Mueller & Larson, P.C.

(57) ABSTRACT

Systems and methods for performing retransfer printing on substrates such as plastic card-shaped substrates. Printing is first performed in at least first and second separate transfer areas on the retransfer film. The retransfer film is then advanced to a retransfer station where the printed transfer areas are transferred to the substrate in a sequence that differs from the sequence in which the printed transfer areas were printed.

14 Claims, 5 Drawing Sheets

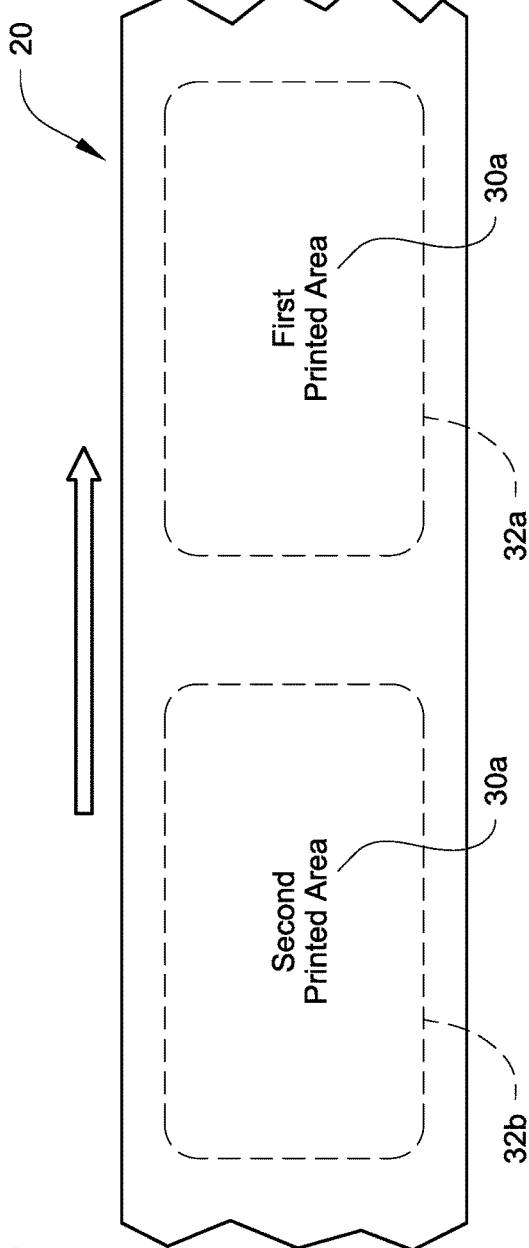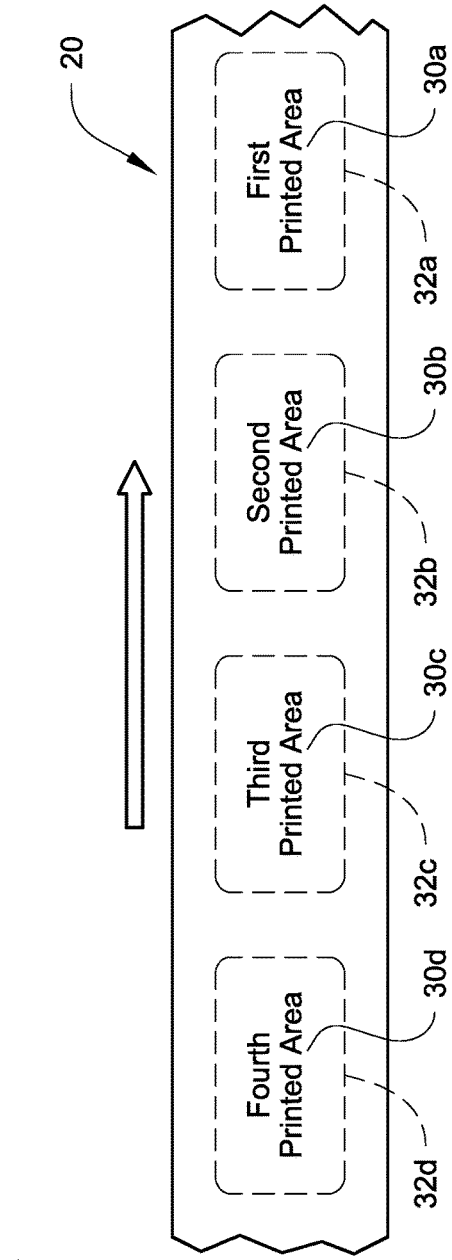
Fig. 3
Fig. 4

OUT-OF SEQUENCE RETRANSFER PRINTING

FIELD

This disclosure relates to retransfer printing on substrates such as plastic card-shaped substrates where the sequence of transfer of transfer areas on a retransfer film to the substrate differs from the sequence of printing of the transfer areas on the retransfer film.

BACKGROUND

Retransfer printing is a well-known process. In one known implementation, a material is first printed on a retransfer film followed by subsequent printing on the retransfer film over the previously applied material. The portion of the retransfer film containing the printing is then transferred to a substrate such as to the surface of a plastic card-shaped substrate.

In another known implementation of retransfer printing, printing is performed on a first area of the retransfer film, and the first area is then transferred to the substrate surface. Thereafter, printing is performed on a second area of the retransfer film, and the second area is then transferred to the substrate overlaying the previously transferred first area. This technique is only effective if the material to be printed is ordered in the correct way on the print ribbon, or if the printer is properly programmed to move the print ribbon back and forth. However, moving the print ribbon back and forth carries with it a risk that the sensor that is used to track movement of the print ribbon may not sense the print ribbon correctly.

SUMMARY

Systems and methods are described for performing retransfer printing on substrates such as plastic card-shaped substrates. Printing is first performed in at least first and second separate transfer areas on the retransfer film. The retransfer film is then advanced to a retransfer station where the printed transfer areas are transferred to the substrate in a sequence that differs from the sequence in which the printed transfer areas were printed. By changing the transfer sequence of the printed transfer areas during the retransfer process compared to the printing sequence, the print ribbon does not need to be backed-up or transferred in a reverse direction to print on the retransfer film thereby eliminating the risk that a print ribbon sensor may not sense the print ribbon correctly during a reverse movement of the print ribbon.

Printing is performed in at least first and second separate transfer areas on the retransfer film. In one embodiment, printing can be performed in two separate transfer areas on the retransfer film. In another embodiment, printing can be performed in more than two separate transfer areas on the retransfer film, such as three, four, or more transfer areas, followed by transferring the printed transfer areas to the substrate in a sequence that differs from the sequence in which the printed transfer areas were printed. In one embodiment, printing in the transfer areas occurs consecutively with the transfer areas located adjacent to one another on the retransfer film, with printing in the first transfer area occurring first followed by printing in the second transfer area (and optionally thereafter followed by printing in third, fourth, etc. transfer areas).

The substrates described herein can be any substrates to which one may wish to transfer printing from a retransfer film onto a surface of the substrate. In one embodiment, the substrate can be a plastic card or passport page. Examples of plastic cards can include, but are not limited to, financial (e.g., credit, debit, or the like) cards, driver's licenses, national identification cards, business identification cards, gift cards, and other plastic cards which bear personalized data unique to the cardholder and/or which bear other card information.

DRAWINGS

FIG. 3 is a top plan view of a section of a retransfer film having two transfer areas containing printing therein.

FIG. 4 is a top plan view of a section of a retransfer film having three or more transfer areas containing printing therein.

DETAILED DESCRIPTION

Systems and methods are described for performing retransfer printing on substrates such as plastic card-shaped substrates. Printing is first performed in at least first and second separate transfer areas on a retransfer film. In one embodiment, printing can be performed in two separate transfer areas on the retransfer film. In another embodiment, printing can be performed in more than two separate transfer areas on the retransfer film, such as three, four, or more transfer areas. The retransfer film is then advanced to a retransfer station where the printed transfer areas are transferred to the substrate in a sequence that differs from the sequence in which the printed transfer areas were printed. In one embodiment, printing in the transfer areas occurs consecutively with the transfer areas located adjacent to one another on the retransfer film, with printing in the first transfer area occurring first followed by printing in the second transfer area (and optionally thereafter followed by printing in third, fourth, etc. transfer areas).

The retransfer printing methods and systems described herein can be applied to retransfer printing on any substrate on which retransfer printing can be performed. However, for sake of convenience, the substrate will hereinafter be described as being a plastic card including, but not limited to, financial (e.g., credit, debit, or the like) cards, driver's licenses, national identification cards, business identification cards, gift cards, and other plastic cards which bear personalized data unique to the cardholder and/or which bear other card information.

The retransfer printing is performed by a retransfer printing system. In the case of plastic cards as the substrates, the retransfer printing system may also be referred to as a card personalization machine or card personalization system. The card personalization machine can be a desktop card personalization machine that is designed to personalize cards one at a time, for example on the order of tens or hundreds per hour, or a central issuance system that is designed to simultaneously personalize multiple cards, for example on the order of thousands per hour. A card personalization machine is intended to encompass a machine that personalizes cards as well as passports and other identification documents.

Figure 1:
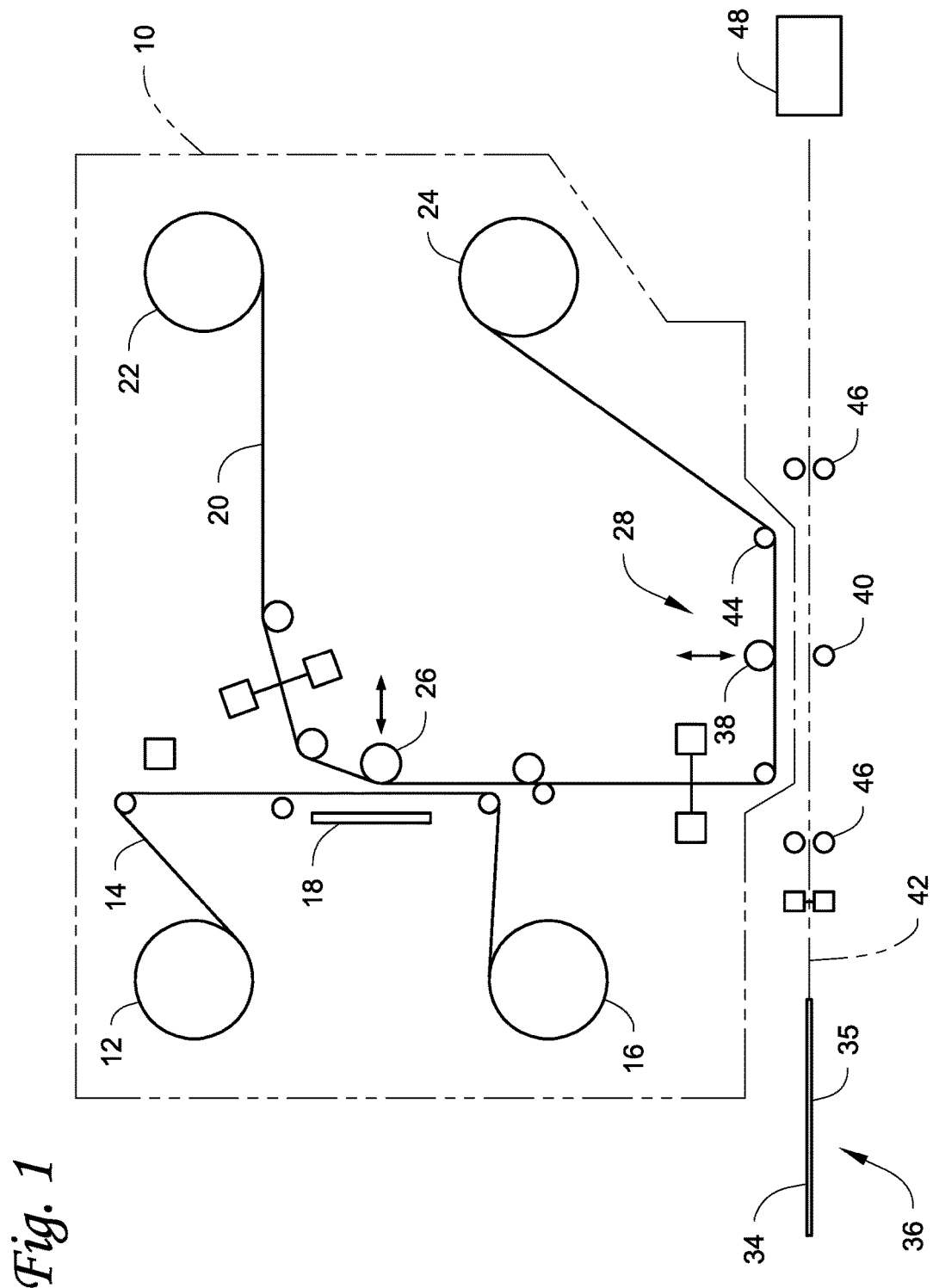
FIG. 1 illustrates a portion of a retransfer printing system that can implement the retransfer printing described herein.

FIG. 1 illustrates an example of a print engine 10 that is configured for retransfer printing. The print engine 10 is part of a card personalization machine. An example of a card personalization machine that can perform retransfer printing is described in U.S. Published Application No. 2016/0300128 filed on Apr. 8, 2016, which is incorporated herein by reference in its entirety. The specific construction and operation of retransfer printers, including the print ribbon, the retransfer film, printing an image on the retransfer film, and transferring the printed image onto a surface of a card, is well known in the art. One example of retransfer printing is disclosed in U.S. Pat. No. 6,894,710 among many others. U.S. Pat. No. 6,894,710 is incorporated herein by reference in its entirety.

The illustrated retransfer printing configuration of the print engine 10 includes a print side that includes a print ribbon supply 12 from which a supply of print ribbon 14 is supplied, and a print ribbon take-up 16 that takes-up used print ribbon 14. The print ribbon is directed past a print head 18, which in the illustrated example can be stationary, and which conducts printing using the print ribbon 14 onto a retransfer film 20. After printing, the used print ribbon 14 is then wound onto the take-up 16.

Figure 2:
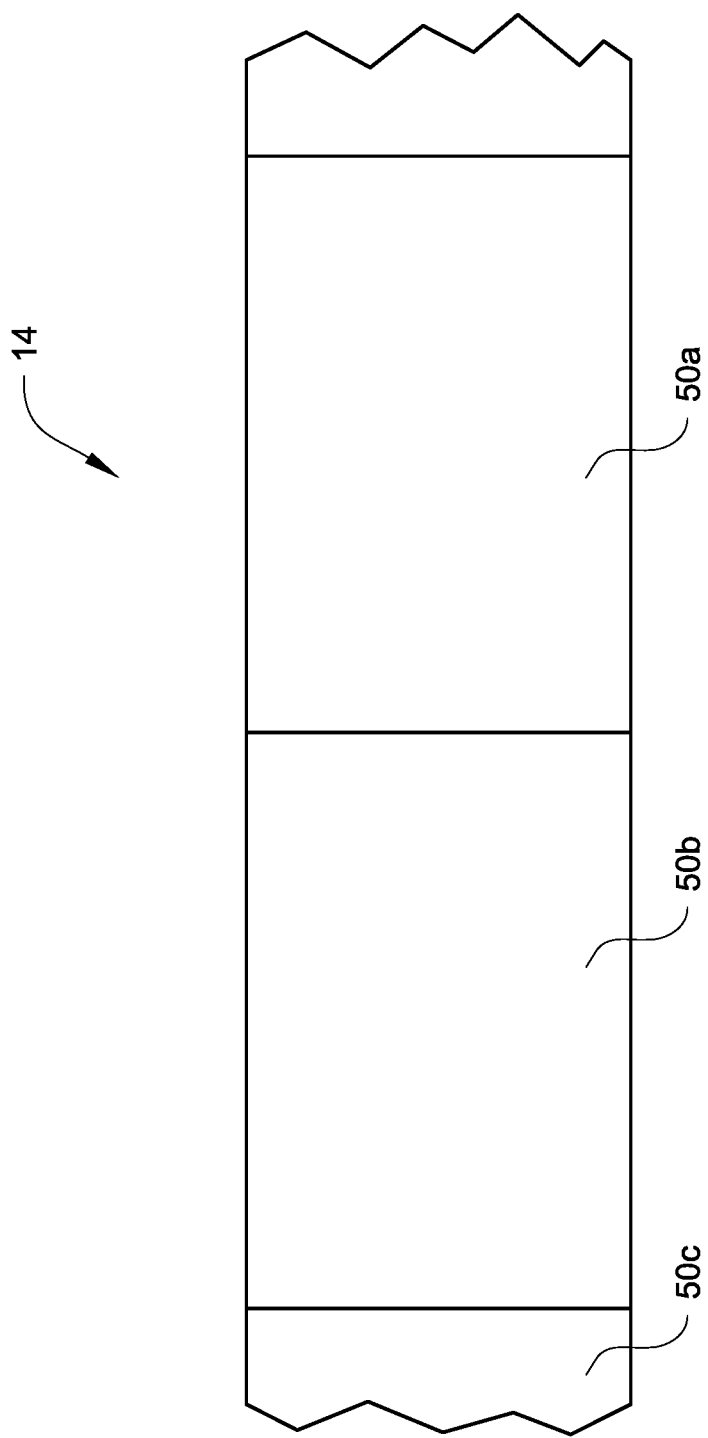
FIG. 2 illustrates a section of print ribbon that can be used in the retransfer printing system.

The print ribbon 14 can be any print ribbon that is suitable for performing the printing described herein. For example, referring to FIG. 2, the print ribbon 14 can include a repeating sequence of discrete panels 50a, 50b, 50c . . . 50n of printable material. In one embodiment, some of the panels on the print ribbon 14 can contain a colorant material such as a colored (i.e. non-transparent) dye or pigment for performing color printing on a transfer area(s) of the retransfer film 20. For example, in one embodiment, examples of colorant material panels include but are not limited to cyan, magenta, yellow, and black (CMYK) colorant material panels. In addition, some of the panels can contain an additional or specialty colorant material that is not CMYK colorant material. Examples of additional or specialty colorant materials include, but are not limited to, a silver colorant material and/or a gold colorant material. In addition, in some embodiments, some of the panels can be fluorescent material panels that are used to print a fluorescent material onto a transfer area(s) of the retransfer film 20. The fluorescent material (if used) is generally transparent to allow viewing of printing that may end up underneath the fluorescent material once the fluorescent material printed onto the retransfer film 20 is transferred to the substrate. In addition, the print ribbon 14 can contain additional panels in each sequence such as a panel of overlay material.

The print ribbon 14 can include any combinations of printable materials that one may wish to print onto the retransfer film 20. For example, in one non-limiting embodiment, the sequence of panels on the print ribbon 14 can be as follows: cyan color panel 50a; magenta color panel 50b; yellow color panel 50c; black color panel (not shown); silver color panel (not shown); optional gold color panel (not shown); fluorescent material panel (not shown) with this sequence repeated over the length of the print ribbon 14. In another non-limiting embodiment, the sequence of panels on the print ribbon 14 can be as follows: silver color panel 50a; optional gold color panel; cyan color panel 50b; magenta color panel 50c; yellow color panel (not shown); black color panel (not shown); fluorescent material panel (not shown) with this sequence repeated over the length of the print ribbon 14. In another non-limiting embodiment, the sequence of panels on the print ribbon 14 can be as follows: fluorescent material panel 50a; silver color panel 50b; optional gold color panel; cyan color panel 50c; magenta color panel (not shown); yellow color panel (not shown); black color panel (not shown) with this sequence repeated over the length of the print ribbon 14. Other panel sequences of the print ribbon 14 are possible.

Print ribbons containing sequences of CMYK and fluorescent material panels are known in the art. In another embodiment, print ribbon can include repeating sequences of fluorescent material panels, CMY panels, and specialty color (for example silver) panels. The print ribbon 14 is not limited to having multiple panels of different colors. Instead, the print ribbon 14 can include fluorescent material panels together with a single color panel with that sequence repeated over the length of the print ribbon 14. In addition, the print ribbon 14 can include repeating sequences of multiple panels of different colors without fluorescent material panels.

Referring back to FIG. 1, the retransfer film 20 is supplied from a film supply 22 on a retransfer side, and after retransfer the remaining film 20 is wound onto a film take-up 24 also on the retransfer side. The retransfer film 20 is directed past a platen roller 26 positioned opposite the print head 18 and which in the illustrated example can be moved toward and away from the print head 18 to press the retransfer film 20 and the print ribbon 14 between the print head 18 and the platen roller 26 during printing onto the retransfer film 20. The retransfer film 20 can be any retransfer film 20 that has a transferrable material layer(s) that can be transferred from the retransfer film 20 onto the substrate.

Figure 6:
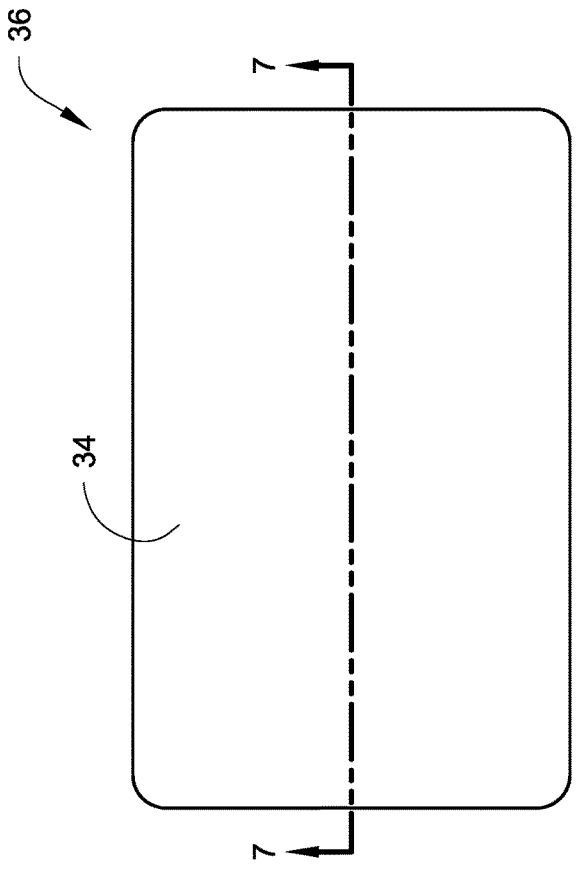
FIG. 6 is a top view of a plastic card substrate that can be printed using the retransfer printing systems and methods described herein.

Referring to FIG. 3, an example of printing on the retransfer film 20 is illustrated. In this example, two sequential, adjacent, separate printed areas 30a, 30b are printed on a transferrable material layer(s) of the retransfer film 20. The arrow indicates the direction of travel of the retransfer film 20 during printing. The construction of a retransfer film with a transferrable material layer(s) is well known in the art. Each printed area 30a, 30b is shown as being surrounded by dashed lines 32a, 32b each of which denotes the outline of a respective transfer area of the transferrable material layer(s) of the film 20, substantially corresponding in size and shape to a surface 34 of a card 36 (FIG. 6), that will be transferred from the retransfer film 20 onto the card 36 thereby covering substantially the entire surface 34. The dashed lines 32a, 32b would not actually be present in the printed areas 30a, 30b. The printed areas 30a, 30b can occupy any portion of, or the entirety of, the respective dashed line areas 32a, 32b. The dashed line area 32a can be referred to as a first transfer area and the dashed line area 32b can be referred to as a second transfer area. The dashed line area 32a together with its associated printed area 30a may also be referred to as a printed transferrable panel. Likewise, the dashed line area 32b together with its associated printed area 30b may also be referred to as a printed transferrable panel.

In FIG. 3, the printed area 30a is printed in the first transfer area 32a first whereby the first transfer area 32a and the printed area 30a together may be referred to as a first printed transferrable panel. The printed area 30b is printed in the second transfer area 32b second (i.e. after the first printed area 30a is printed) whereby the second transfer area 32b and the printed area 30b together may be referred to as a second printed transferrable panel. This sequence of printing eliminates the need to reverse the direction of either the print ribbon 14 or the retransfer film 20 in order to print the printed areas 30a, 30b (however the retransfer film 20 may be backed up or reversed in order to transfer the transfer areas 32a, 32b to the substrate). However, in some embodiments, it is possible to print the printed area 30b first, followed by printing the printed area 30a second.

FIG. 4 illustrates another example of printing on the retransfer film 20. The arrow indicates the direction of travel of the retransfer film 20 during printing. In this example, printed areas 30a, 30b, 30c, 30d, etc. are printed in the transfer areas 32a, 32b, 32c, 32d, etc. of the transferrable material layer(s) of the retransfer film 20. The printed area 30a is printed first, followed by printing the printed area 30b, followed by printing the printed area 30c, followed by printing the printed area 30d, etc.

Many printing combinations in the printed areas are possible. For example, in one non-limiting embodiment and referring to FIG. 3, one of the printed panel 30a, 32a or 30b, 32b can be referred to as a CMYK or CMY panel where the printed area is a multi-color printed area resulting from individual CMYK or CMY colors and/or combinations of CMYK or CMY colors, while the other printed panel 30a, 32a or 30b, 32b is a panel in which the specialty color (for example silver and/or gold) material and fluorescent material is printed. Alternatively, the specialty color material can be printed on the CMYK or CMY panel. In another non-limiting embodiment and referring to FIG. 4, one of the printed panels can be a panel that is printed with silver and/or gold color material, one of the printed panels can be a CMYK or CMY panel where the printed area thereof is a multi-color printed area resulting from individual CMYK or CMY colors and/or combinations of CMYK or CMY colors, and another one of the printed panels can be a panel that is printed with fluorescent material. These are examples only and other numbers of printed panels can be created on the retransfer film 20, and other combinations of printed areas can be printed.

In some embodiments, the fluorescent material is printed first so the fluorescent material is arranged first in each sequence on the print ribbon. If the specialty color, such as silver, is part of text, in some embodiments the specialty color is arranged away from the card surface. Therefore, the specialty color is applied to a transfer area that is transferred onto the card above an already transferred transfer area. If the specialty color, such as silver, is intended to be part of a background, in some embodiments the specialty color is closer to the card surface and is therefore applied to the transfer area that will be the first one transferred to the card.

Returning to FIG. 1, once the desired printed areas 30a, 30b, etc. are printed onto the transferrable material layer(s) of the retransfer film 20 in the transfer areas 32a, 32b, etc., the section of the retransfer film 20 with the transfer areas 32a, 32b, etc. is advanced to a transfer station 28 where the transfer areas 32a, 32b, etc. along with their printed areas 30a, 30b, etc. are transferred onto the card 36. In this example, the transfer station 28 includes a heated transfer mechanism 38, for example a transfer roller, that is movable toward and away from a fixed platen 40 positioned on the opposite side of a card travel or transport path 42. The heated transfer mechanism 38 presses the portions of the retransfer film 20 containing the transfer areas 32a, 32b, etc. against the card 36 which is backed by the platen 40, with the retransfer film 20 and the card 36 then being transported together past the heated transfer mechanism 38 to transfer the transferrable material layer(s) of the retransfer film 20 containing the transfer areas 32a, 32b, etc. and the printed areas 30a, 30b, etc. onto the card 36. The retransfer film 20 and the card 36 are then transported to a stripping station 44 where the transferrable material layer(s) of the retransfer film 20 is stripped from the card 36 leaving behind the transfer areas 32a, 32b, etc. on the card 36. The remainder of the retransfer film 20, minus the transferred transfer areas 32a, 32b, etc. is then wound onto the film take-up 24. The card 36 is transported along the card travel path 42 by a card transport mechanism, such as sets of rollers 46.

As indicated above, the transfer areas 32a, 32b, etc. are transferred to the card 36 in a transfer sequence that differs from the printing sequence of the transfer areas 32a, 32b, etc. Many transfer sequences are possible.

For example, referring to FIG. 3, the transfer sequence can be such that the second transfer area 32b is transferred onto the surface 34 of the card 36 first, followed by transferring the first transfer area 32a onto the card 36 overlaying the transferred second transfer area 32b. So when the retransfer film 20 bearing the first and second transfer areas 32a, 32b is advanced to the transfer station 28, the retransfer film 20 is initially advanced so as to align the second transfer area 32b with the surface 34 of the card 36. The retransfer film 20 and the card 36 are then transported together past the heated transfer mechanism 38 to press the transferrable material layer(s) of the second transfer area 32b on the retransfer film 20 containing the printed area 30b against the card surface 34. The retransfer film 20 and the card 36 are then transported to the stripping station 44 where the transferrable material layer(s) of the retransfer film 20 is then stripped from the card surface 34 leaving behind the second transfer area 32b and the printed area 30b on the card surface 34. Thereafter, the card 36 is transported in a reverse direction by the card transport mechanism 46 to return the card 36 upstream of the heated transfer mechanism 38. In addition, the retransfer film 20 is also reversed in direction to bring the first transfer area 32a upstream of the heated transfer mechanism 38. Once the first transfer area 32a and the card surface 34 are aligned, the retransfer film 20 and the card 36 are then transported together past the heated transfer mechanism 38 to press the transferrable material layer(s) of the first transfer area 32a on the retransfer film 20 containing the printed area 30a against the card 36 overlaying the previously transferred second transfer area 32b. The retransfer film 20 and the card 36 are then transported to the stripping station 44 where the transferrable material layer(s) of the retransfer film 20 is then stripped from the card 36 leaving behind the first transfer area 32a and the printed area 30a on the card 36 overlaying the previously transferred second transfer area 32b.

Referring to FIG. 4, transfer areas 32a, 32b, 32c, etc. can be transferred in any transfer sequence different from the printing sequence. For example, in the case of three transfer areas, the third transfer area 32c can be transferred onto the surface 34 of the card 36 first, followed by transferring the second transfer area 32b onto the card 36 overlaying the transferred third transfer area 32c, followed thereafter by transferring the first transfer area 32a onto the card 36 overlaying the transferred second and third transfer areas 32b, 32c.

In some embodiments, for example where printing on both surfaces of the card 36 is desired, an optional card reorienting mechanism 48 (or card flipper 48) can be located downstream of the stripping station 44 in the card travel path 38. The card reorienting mechanism 48 can receive the card 36 after the transfer areas 32a, 32b, etc. have been applied to the surface 34 of the card 36, and flip the card 36 over (i.e. flip the card 180 degrees) so that the opposite surface 35 is now facing upward. The card 36 can then be transported back upstream of the transfer station 28 in order to retransfer print a printed image onto the opposite surface 35. The printing on the opposite surface 35 can be similar to the printing on the surface 34, namely transfer areas can be transferred from the retransfer film 20 onto the surface 35. Alternatively, the printing on the opposite surface 35 can include the transfer of a single transfer area from the retransfer film 20. In embodiments where printing on the opposite surface 35 is not required, the card reorienting mechanism 48 is not required and can be removed, or the card 36 can be transported through the card reorienting mechanism 48 without flipping the card 36.

Figure 5:
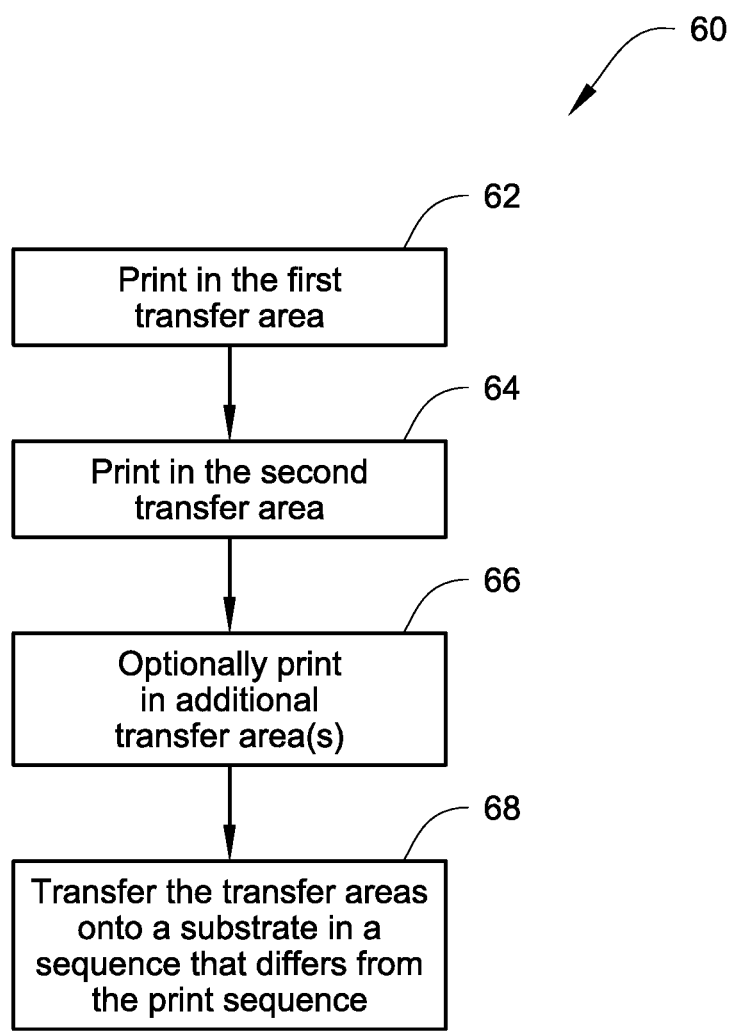
FIG. 5 illustrates an example retransfer printing method described herein.

Referring to FIG. 5 along with FIGS. 3 and 4, an example retransfer printing method 60 described herein is illustrated. In a step 62, printing in the first transfer area on the retransfer film 20 takes place. Thereafter, in a step 64, printing in the second transfer area on the retransfer film 20 takes place. Printing can optionally occur in additional (e.g. third, fourth, etc.) transfer areas in a step 66. Thereafter, the retransfer film 20 is advanced to the transfer station, and in a step 68 the transfer areas are transferred onto the card in a transfer sequence that differs from the printing sequence of the transfer areas. For example, in the case of two transfer areas as shown in FIG. 3, the second transfer area 32b is transferred onto the surface of the card as described above, and thereafter the first transfer area 32a is transferred onto the card overlaying the previously transferred second transfer area 32b as described above.

The following table provides examples of printing sequences and corresponding transfer sequences of the transfer areas, as well as specific examples of printed material(s) printed in the transfer areas. The following sequences and printed materials are examples only. Many other printing and transfer sequences and printed materials are possible.

However, one or more intervening layers of material can be provided between the surface 34 of the card 36 and the bottom surface of the layer of the transfer area 32b, and one or more intervening layers of material can be provided between the upper surface of the layer formed by the transfer area 32b and the layer formed by the transfer area 32a. Each of the transfer areas 32a, 32b can be referred to as being fixed to the surface 34 or fixed to the card 36. In addition, as indicated in dashed lines in FIG. 7, one or more additional layers from additional transfer areas 32c, 32d, etc. can be disposed over the layer of the transfer area 32a.

As would be understood by a person of ordinary skill in the art, the surfaces 34, 35 can include additional features such as printed text and graphics that can be applied by retransfer printing or direct-to-card printing (or combinations thereof), embossing, indent printing, a magnetic stripe, an integrated circuit chip, one or more holograms and/or other security features, and the like.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A retransfer printing method, comprising:
    printing within first and second transfer areas of a transferrable material of a retransfer film in a printing sequence; and

|  | Printing Sequence | Transfer Sequence | Example Printed Material(s) |
|---|---|---|---|
| Example 1 | 1. Transfer Area 1<br>2. Transfer Area 2 | 1. Transfer Area 2<br>2. Transfer Area 1 | 1. Transfer Area 1 - Fluorescent Material<br>2. Transfer Area 2 - CMYK |
| Example 2 | 1. Transfer Area 1<br>2. Transfer Area 2 | 1. Transfer Area 2<br>2. Transfer Area 1 | 1. Transfer Area 1 - Specialty color (e.g. silver) and Fluorescent Material<br>2. Transfer Area 2 - CMYK or CMY |
| Example 3 | 1. Transfer Area 1<br>2. Transfer Area 2 | 1. Transfer Area 2<br>2. Transfer Area 1 | 1. Transfer Area 1 - Fluorescent Material<br>2. Transfer Area 2 - CMY or CMYK and Specialty color (e.g. silver) |
| Example 4 | 1. Transfer Area 1<br>2. Transfer Area 2<br>3. Transfer Area 3 | 1. Transfer Area 3<br>2. Transfer Area 2<br>3. Transfer Area 1 | 1. Transfer Area 1 - Fluorescent Material<br>2. Transfer Area 2 - CMYK or CMY<br>3. Transfer Area 3 - Specialty color (e.g. silver) |
| Example 5 | 1. Transfer Area 1<br>2. Transfer Area 2<br>3. Transfer Area 3 | 1. Transfer Area 3<br>2. Transfer Area 1<br>3. Transfer Area 2 | 1. Transfer Area 1 - Fluorescent Material<br>2. Transfer Area 2 - CMYK or CMY<br>3. Transfer Area 3 - Specialty color (e.g. silver) |
| Example 6 | 1. Transfer Area 1<br>2. Transfer Area 2<br>3. Transfer Area 3 | 1. Transfer Area 2<br>2. Transfer Area 3<br>3. Transfer Area 1 | 1. Transfer Area 1 - Fluorescent Material<br>2. Transfer Area 2 - CMYK or CMY<br>3. Transfer Area 3 - Specialty color (e.g. silver) |
| Example 7 | 1. Transfer Area 1<br>2. Transfer Area 2<br>3. Transfer Area 3 | 1. Transfer Area 2<br>2. Transfer Area 1<br>3. Transfer Area 3 | 1. Transfer Area 1 - Fluorescent Material<br>2. Transfer Area 2 - CMYK or CMY<br>3. Transfer Area 3 - Specialty color (e.g. silver) |

Figure 7:
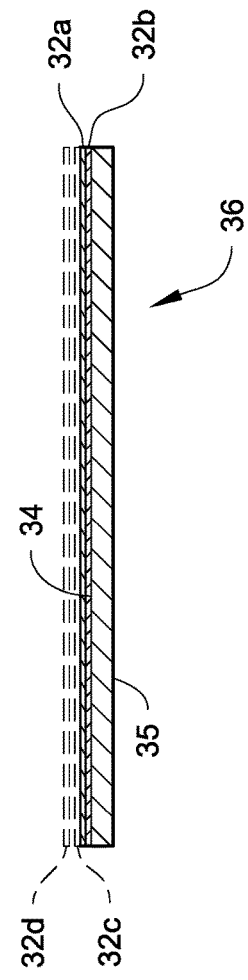
FIG. 7 is a cross-sectional view taken along line 7-7 of FIG. 6 showing the plastic card after transferring the transfer areas onto the card.

FIG. 7 is a cross-sectional view of the card 36 after transferring the transfer areas 32a, 32b, etc. For example, in the case of the embodiment shown in FIG. 3, the transfer area 32b is transferred first followed by the transfer area 32a. The layer formed by the transferrable material layer(s) of the transfer area 32b is fixed to the surface 34 of the card 36, while the layer formed by the transferrable material layer(s) of the transfer area 32a is above the transfer area 32b. In the illustrated example, a bottom surface of the layer formed by the transfer area 32b is fixed directly to the surface 34, while a bottom surface of the layer formed by the transfer area 32a is fixed directly to an upper surface of the transfer area 32b.

thereafter transferring the first and second transfer areas of the transferrable material of the retransfer film onto a substrate using a transfer sequence that differs from the printing sequence.

2. The retransfer printing method of claim 1, wherein the printing sequence comprises printing within the first transfer area and thereafter printing within the second transfer area, and the transfer sequence comprises transferring the transferrable material of the second transfer area onto the substrate and thereafter transferring the transferrable material of the first transfer area onto the substrate so that the transferrable material of the first transfer area overlays the transferrable material of the second transfer area.

3. The retransfer printing method of claim 1, wherein the printing in the first transfer area comprises printing with a fluorescent material.

4. The retransfer printing method of claim 1, wherein the substrate is a plastic card, and the surface is a front or rear surface of the plastic card.

5. The retransfer printing method of claim 4, wherein the first transfer area has a size and shape that substantially corresponds to the size and shape of the front or rear surface of the plastic card; and the second transfer area has a size and shape that substantially corresponds to the size and shape of the front or rear surface of the plastic card.

6. A retransfer printing method, comprising:
   printing within a first area of a transferrable material of a retransfer film;
   thereafter printing within a second area of the transferrable material of the retransfer film downstream of the first area; and
   after the first area and the second area are printed on the transferrable material of the retransfer film, transferring the transferrable material containing the second area onto a surface of a substrate and thereafter transferring the transferrable material containing the first area onto the substrate overlaying the second area.

7. The retransfer printing method of claim 6, wherein the substrate is a plastic card, and the surface is a front or rear surface of the plastic card.

8. The retransfer printing method of claim 7, wherein the first area is printed within a first transfer area of the transferrable material that is transferred onto the plastic card, the first transfer area has a size and shape that substantially corresponds to the size and shape of the front or rear surface of the plastic card; and the second area is printed within a second transfer area of the transferrable material that is transferred onto the plastic card, the second transfer area has a size and shape that substantially corresponds to the size and shape of the front or rear surface of the plastic card.

9. The retransfer printing method of claim 6, wherein the second area is printed on the transferrable material of the retransfer film adjacent to the first area.

10. The retransfer printing method of claim 6, wherein the printing in the first area comprises printing with a fluorescent material.

11. A method of retransfer printing on a surface of a plastic card substrate, comprising:
    printing within a first transfer area on a transferrable material of a retransfer film, the transferrable material of the first transfer area is transferrable from the retransfer film onto the plastic card substrate, and the first transfer area has a size and shape that substantially corresponds to a size and shape of the surface of the plastic card substrate;
    thereafter printing within a second transfer area on the transferrable material of the retransfer film, the second transfer area is located downstream of the first transfer area, the transferrable material of the second transfer area is transferrable from the retransfer film onto the plastic card substrate, and the second transfer area has a size and shape that substantially corresponds to the size and shape of the surface of the plastic card substrate; and
    after printing within the first transfer area and printing within the second transfer area, transferring the transferrable material of the second transfer area onto the plastic card substrate and thereafter transferring the transferrable material of the first transfer area onto the plastic card substrate overlaying the transferrable material of the second transfer area.

12. The method of claim 11, wherein the surface is a front or rear surface of the plastic card substrate.

13. The method of claim 11, wherein the second transfer area is adjacent to the first transfer area.

14. The method of claim 11, wherein the printing in the first transfer area comprises printing with a fluorescent material.

* * * * *